(12) United States Patent
Geurts

(10) Patent No.: US 10,531,027 B2
(45) Date of Patent: *Jan. 7, 2020

(54) BACKSIDE ILLUMINATED GLOBAL SHUTTER PIXEL WITH ACTIVE RESET

(71) Applicant: SEMICONDUCTOR COMPONENTS INDUSTRIES, LLC, Phoenix, AZ (US)

(72) Inventor: Tomas Geurts, Hassrode (BE)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/166,442

(22) Filed: Oct. 22, 2018

(65) Prior Publication Data

US 2019/0058840 A1    Feb. 21, 2019

Related U.S. Application Data

(63) Continuation of application No. 15/095,304, filed on Apr. 11, 2016, now Pat. No. 10,225,499.

(51) Int. Cl.
*H04N 3/14* (2006.01)
*H04N 5/363* (2011.01)
*H04N 5/3745* (2011.01)

(52) U.S. Cl.
CPC ........... *H04N 5/363* (2013.01); *H04N 5/3745* (2013.01); *H04N 5/37452* (2013.01)

(58) Field of Classification Search
CPC ....... H04N 5/37457; H04N 5/357–363; H04N 5/378; H04N 5/374; H01L 27/14609
See application file for complete search history.

(56) References Cited

U.S. PATENT DOCUMENTS

| | | |
|---|---|---|
| 5,625,210 A | 4/1997 | Lee et al. |
| 6,917,027 B2 | 7/2005 | Krymski |
| 7,081,607 B1 | 7/2006 | Koizumi |
| 8,569,671 B2 | 10/2013 | Meynants et al. |
| 8,987,646 B2 | 3/2015 | De Witt et al. |
| 9,456,159 B1 | 9/2016 | Hynecek |
| 2002/0093034 A1 | 7/2002 | Hynecek |
| 2005/0195306 A1 | 9/2005 | Koyama |

(Continued)

*Primary Examiner* — Sinh Tran
*Assistant Examiner* — Selam T Gebriel
(74) *Attorney, Agent, or Firm* — Treyz Law Group, P.C.; Joseph F. Guihan

(57) ABSTRACT

An image sensor may include an array of pixels arranged in rows and columns. The array of pixels may operate in a global shutter mode. Each pixel in the array of pixels may have a floating diffusion node for storing charge and may include an active reset circuit that acts as an inverting amplifier and that resets the floating diffusion node to a predetermined reference voltage, which eliminates the need for correlated double sampling readout. A sampling circuit may be coupled to the active reset circuit. The sampling circuit may sample and store signals that correspond to the amount of charge stored at the floating diffusion node. The sampling circuit may pass stored signals to a column sensing line through an amplifier. The amplifier may include a source follower transistor that provides proportional amplification to the stored signals and may include an active reset circuit for resetting the sampling circuit.

20 Claims, 4 Drawing Sheets

(56) References Cited

U.S. PATENT DOCUMENTS

| | | | |
|---|---|---|---|
| 2006/0001752 A1 | 1/2006 | Yanagisawa et al. | |
| 2008/0210986 A1 | 9/2008 | Mauritzson | |
| 2009/0230289 A1* | 9/2009 | LePage | H01L 27/14603 |
| | | | 250/208.1 |
| 2010/0243866 A1* | 9/2010 | Mo | H03F 3/08 |
| | | | 250/214 A |
| 2011/0267505 A1* | 11/2011 | Dierickx | H04N 5/357 |
| | | | 348/241 |
| 2013/0258151 A1 | 10/2013 | Ayers et al. | |

* cited by examiner

BACKSIDE ILLUMINATED GLOBAL SHUTTER PIXEL WITH ACTIVE RESET

This application is a continuation of patent application Ser. No. 15/095,304, filed Apr. 11, 2016, which is hereby incorporated by reference herein in its entirety. This application claims the benefit of and claims priority to patent application Ser. No. 15/095,304, filed Apr. 11, 2016.

BACKGROUND

This relates generally to imaging devices, and more particularly, to imaging devices with improved backside illumination (BSI) compatible global shutter pixels that do are less sensitive to imperfect light shielding.

Modern electronic devices such as cellular telephones, cameras, and computers often use digital image sensors. Image sensors (sometimes referred to as imagers) may be formed from a two-dimensional array of image sensing pixels. Each pixel includes a photosensitive region that receives incident photons (light) and converts the photons into electrical signals. Image sensors are sometimes designed to provide images to electronic devices using a Joint Photographic Experts Group (JPEG) format.

Image sensors may sense light by converting impinging photons into electrons or holes that are integrated (collected) in sensor pixels. After completion of an integration cycle, collected charge is converted into a voltage, which is then supplied to the output terminals of the sensor. After charge to voltage conversion is completed and the resulting signal transferred out from the pixels, the pixels may be reset in order to be ready for accumulation of new charge.

Some conventional image sensors use a global shutter method to read out signals from all pixels in the image sensor simultaneously. These global shutter pixels are susceptible to kTC noise, and can experience undesirable interference from incident light when used in BSI image sensors.

It would therefore be desirable to be able to provide imaging devices with improved global shutter pixels that are compatible with BSI image sensors.

Some conventional image sensors use a global shutter method that involve storing signal charges on capacitors in the voltage domain. These global shutter pixels require large capacitors to store both RESET and SIGNAL values, as described in, for example, U.S. Pat. No. 8,569,671, entitled "Pixel Array Capable of Performing Pipelined Global Shutter Operation Including a First and Second Buffer Amplifier." Unfortunately, these capacitors take up an undesirably large amount of space on the image sensor.

It would therefore be desirable to be able to provide imaging devices with global shutter pixels that require fewer or smaller capacitors.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
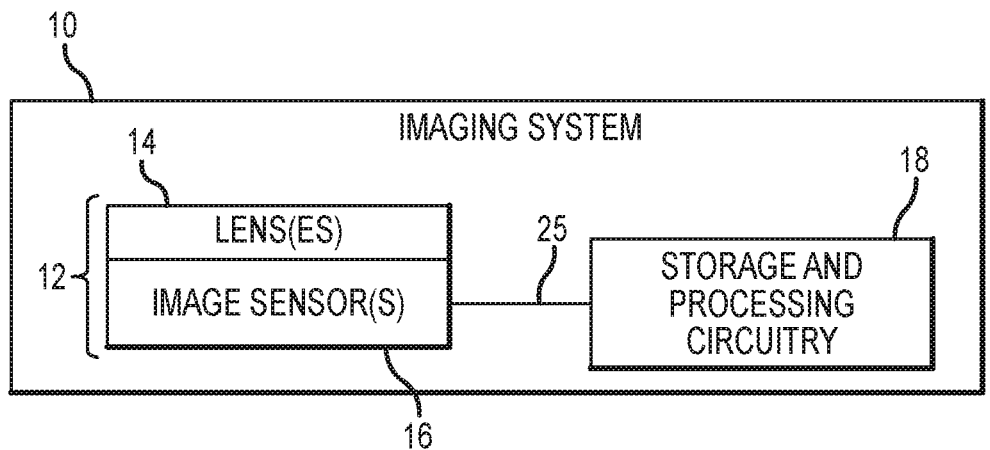
FIG. 1 is a diagram of an illustrative electronic device having an image sensor and processing circuitry for capturing images using an array of image pixels in accordance with an embodiment.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
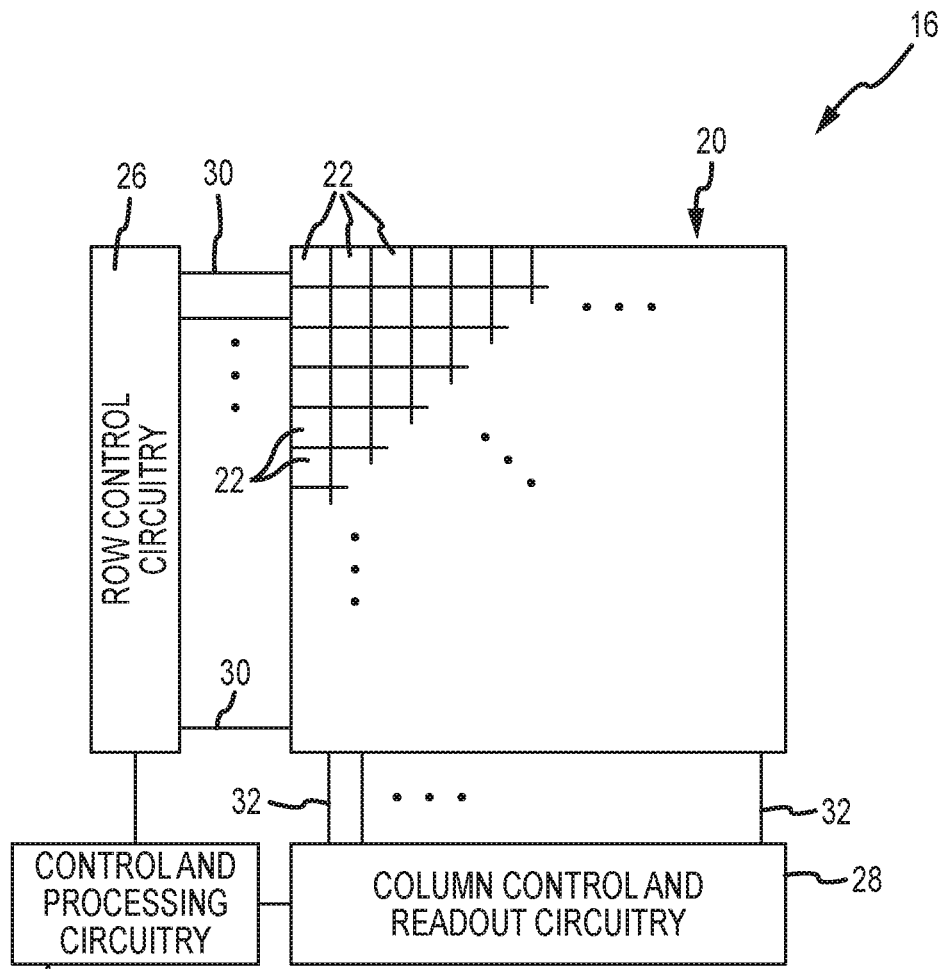
FIG. 2 is a diagram of an illustrative pixel array and associated readout circuitry for reading out image signals from the pixel array in accordance with an embodiment.

As shown in FIG. 2, image sensor 16 may include a pixel array 20 containing image sensor pixels 22 arranged in rows and columns (sometimes referred to herein as image pixels or pixels) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32. If desired, during pixel readout operations, one or multiple rows in array 20 may be selected using row control circuitry 26 and pixel control signals may be manipulated so as to operate the pixels in the selected row or rows in an operating mode as desired. Such operating mode may involve but may not be limited to, actively resetting the pixels in the selected rows or transferring charges or voltages within the pixel from one node to another.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

If desired, image pixels 22 may include one or more photosensitive regions for generating charge in response to image light. Photosensitive regions within image pixels 22 may be arranged in rows and columns on array 20. Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 22.

Figure 3:
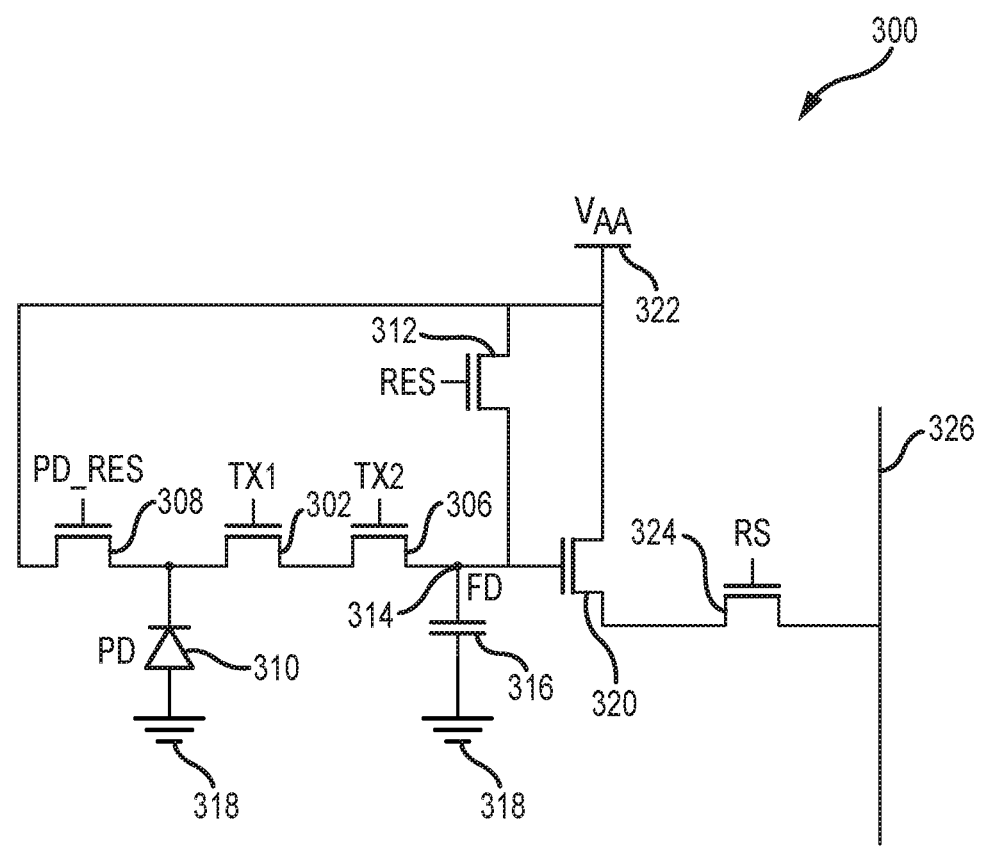
FIG. 3 is a circuit diagram of an image sensor pixel that uses a global shutter method of readout in accordance with an embodiment.

FIG. 3 is a circuit diagram of an image sensor pixel 300 that uses a global shutter method of readout. Image sensors pixel 300 represents a global shutter pixel with pinned photodiode 310 (PD) coupled to memory node 302 (sometimes referred herein to as a storage node). In some embodiments, memory node 302 may be a storage gate or a storage diode. For embodiments in which memory node 302 is a storage gate, an additional transistor may be optionally interposed between memory node 302 and photodiode 310. For embodiments in which memory node 302 is a storage diode, an additional transistor may be interposed between memory node 302 and photodiode 310. Anti-blooming transistor 308 is partially activated using control signal PD_RES in order to draw away dark current that accumulates on photodiode 310. If desired, anti-blooming transistor 308 may be fully activated using control signal PD_RES in order to reset the photodiode. The impinging light (i.e., incident light) generated charge from photodiode 302 in a sensor array (e.g., array 20 in FIG. 2) may be transferred to memory node 302 globally for all of the pixels at the same time by asserting control signal TX1. The readout of charge from the memory node 302 then proceeds in a sequential manner row by row by transferring charge via charge transferring transistor 306 to floating diffusion (FD) node 314 by asserting control signal TX2. Floating diffusion node 314 may have a floating diffusion capacitance 316 for storing charge. Photodiode 310 and floating diffusion capacitance 316 may be coupled to ground 318. Charge transferred to floating diffusion node 314 causes the potential on this node to change and this change is sensed by the source follower transistor 320. A source-drain terminal of source follower transistor 320 is connected via row select transistor 324 to the sensor array column sensing line 326 that deliver the pixel signal to the periphery of the array for further processing. Control signal RS is asserted to activate row select transistor 324 to transfer the pixel signal to column sensing lines 326. After charge sensing has been completed, floating diffusion node 314 is reset by momentarily turning on reset transistor 312 by asserting control signal RES to transfer supply voltage $V_{AA}$ from supply 322 to floating diffusion node 314.

However, this type of reset may cause kTC reset noise generation on this node. Therefore, it may be necessary to use the CDS signal readout technique to minimize its deleterious effects on the signal. The CDS charge detection scheme consists of reading the potential on floating diffusion node 314 prior to charge transfer and then again after the charge transfer. These two values are then subtracted from each other by circuits located at the periphery of the array resulting in the signal without kTC reset noise.

To implement this concept, the pixel size needs to be increased by incorporating the pixel area consuming memory node 302 into every pixel. This may increase the size of the image sensor. Another disadvantage of pixel 300 is the problem of insufficient light shielding of memory node 302 when used in backside illuminated (BSI) applications. Memory node 302 is sensitive to light and must be shielded in order to prevent noise generated by interference from incident light. However, in a BSI pixel, this type of shielding is not feasible. Leaving memory node 302 unshielded may result in poor pixel shutter efficiency.

Figure 4:
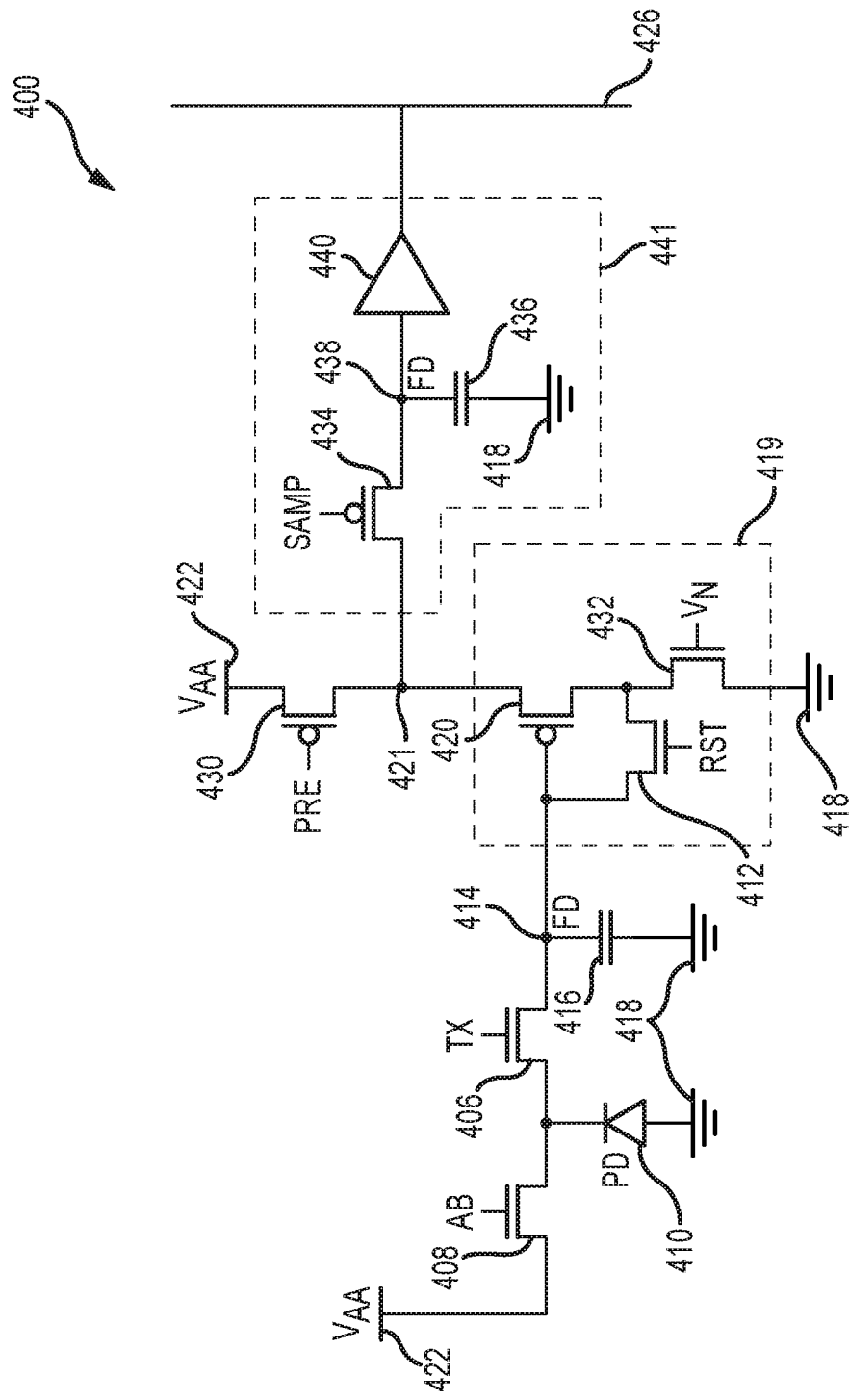
FIG. 4 is a circuit diagram of an illustrative image sensor pixel that uses a global shutter method of read out and that includes an active reset structure and an improved sample circuit in accordance with an embodiment.

FIG. 4 is a circuit diagram of an improved global shutter pixel 400 that utilizes active reset in order to eliminate the need for using the CDS readout technique and thereby eliminate the need for a charge domain memory node (e.g., memory node 302 in FIG. 3). Global shutter pixel 400 may be part of an array of pixels (e.g., array 22 in FIG. 2) in an image sensor. Pixel 400 may be smaller in size compared to pixel 300 of FIG. 3 due to the absence of a memory node (e.g., memory node 302 in FIG. 3). The pixel of FIG. 4 utilizes a different kind of reset technique in which a voltage gain amplifier with negative feedback is integrated directly into the pixel circuit. It should be noted that the active reset structure of FIG. 4 is not limited to global shutter pixels and may be used in a variety of types of CMOS image sensor arrays.

As shown in FIG. 4, photodiode (PD) 410 may collect and integrate electrons that are generated by photons (i.e., light) impinging on the image sensor from the back side of the substrate. All pixels in the array containing pixel 400 may transfer charge from photodiode 410 to floating diffusion (FD) node 414 through transfer transistor 406 simultaneously by asserting control signal TX. The transferred charge may be stored on the floating diffusion capacitance 416. Photodiode 410 and floating diffusion capacitance 416 may be coupled to ground 418. Before transferring charge with transfer transistor 406, floating diffusion node 414 may be reset to a predetermined voltage reference. Floating diffusion reset may be accomplished using active reset circuit 419, which includes PMOS source follower transistor 420, NMOS transistor 432, and reset transistor 412. NMOS transistor 432 receives control signal $V_n$ and creates a constant current load. PMOS source follower transistor 420 and NMOS transistor 432 represent an inverting amplifier. The gate of PMOS source follower transistor 420 may be connected to floating diffusion node 414 and any reset voltage error appearing on floating diffusion node 414 is inverted, amplified, and fed back onto floating diffusion node 414 through reset transistor 412 by asserting control signal RST. A source-drain terminal of source follower transistor 420 may be coupled to floating diffusion node 414 through reset transistor 412 and may be coupled to ground 418 through NMOS transistor 432. Reset transistor 412 is interposed in a feedback loop for compensating for reset error. Floating diffusion node 414 is thereby always reset near the same predetermined reference voltage with minimal or no kTC reset noise. After active reset of floating diffusion node 414 is complete, active reset circuit 419 may be turned off by deasserting control signal $V_n$ to deactivate NMOS transistor 432 in order to save sensor power.

PMOS source follower transistor 420 may use holes for conduction, while NMOS transistor 432 may use electrons for conduction. PMOS source follower transistor 420 may be a p-channel gain transistor, while NMOS transistor 432 may be an n-channel load transistor. PMOS source follower transistor 420 may act as a signal buffer. NMOS transistor 432 may receive control signal $V_n$, which may be a voltage reference that partially activates NMOS transistor 432.

During signal read operations of pixel 400, node 421 may be set to a voltage level that is proportional to the voltage at floating diffusion node 414. Pre-charge transistor 430 may receive control signal PRE, which may be asserted in order to pre-charge node 421 using voltage $V_{AA}$ provided by supply 422 or provide a constant current bias to 420 depending on the level provided at PRE. In some embodiments, pre-charge transistor 430 may be a current source load. Charge corresponding to the voltage at node 421 may be sampled using sampling circuit 441. Sampling circuit 441 may include sampling transistor 434, node 438, sampling capacitor 436, and amplifier 440. Charge sampled using sampling circuit 441 may be stored at node 438 using sampling capacitor 436 after being transferred through sampling transistor 434 by asserting control signal SAMP. Sampling capacitor 436 may be coupled to ground 418. The signal at sampling capacitor 436 may be amplified using amplifier 440 before it is passed to column sensing line 426.

Sampling transistor 434 may be a PMOS transistor. By using a PMOS transistor as the sampling transistor, the junction that includes sampling transistor 434 has reduced sensitivity to light, which provides for enhanced global shutter efficiency.

Anti-blooming transistor 408 may be coupled between photodiode 410 and voltage supply 422. Anti-blooming transistor 408 may function similar to anti-blooming transistor 308 described above in connection with FIG. 3. It should be noted that anti-blooming transistor 408 is optional because charges are only held on floating diffusion node 414 for a short period after transferring charges from photodiode 410 before the related information is transferred to sampling capacitor 436.

Figure 5:
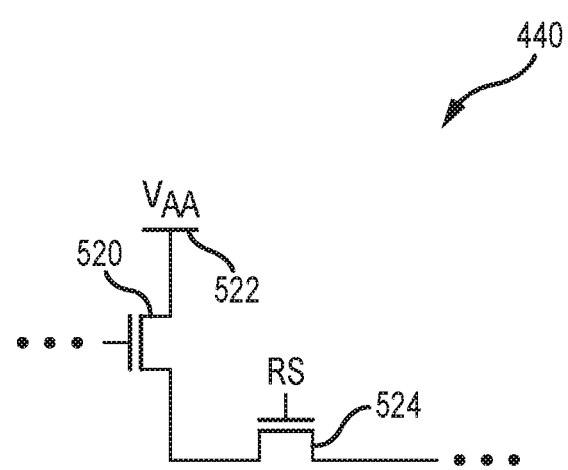
FIG. 5 is a circuit diagram of an illustrative amplifier that may be used in the improved sample circuit of FIG. 4 in accordance with an embodiment.

Amplifier 440 may have a variety of configurations. As shown in FIG. 5, amplifier 440 may include a source follower transistor 520 and a row select transistor 524. Source follower transistor 520 may perform signal buffering by receiving an input signal (e.g., a signal corresponding to the charge at sampling capacitor 434 in FIG. 4) at its gate and may produce a larger proportional signal at its source-drain terminals by manipulating voltage $V_{AA}$ provided by supply 522. Row select transistor 524 may be coupled between a source-drain terminal of source follower transistor 520 and a column sensing line (e.g., column sensing line 426 in FIG. 4). Row select transistor 524 may pass the proportional signal produced by transistor 520 to the column sensing line when control signal RS is asserted.

Alternatively, amplifier 440 may further include an active sampling circuit that is, in concept, similar to active reset circuit 419 in FIG. 4. The inclusion of an active sampling circuit in amplifier 440 may allow for a reduction in the size of sampling capacitor 436.

Various embodiments have been described illustrating systems and methods for generating images using an image sensor pixel array having global shutter pixels that use active reset.

An imaging system may include an array of imaging pixel arranged in rows and columns. Each pixel in the imaging pixel array may include a photosensitive element that generates charge in response to incident light, a floating diffusion region that is coupled to the photosensitive element through a transfer transistor, an active reset circuit coupled to the floating diffusion node, a sampling circuit coupled to the active reset circuit, and a column sensing line coupled to the sampling circuit. An anti-blooming transistor may be coupled between the photodiode and a voltage supply. The active reset circuit may set the floating diffusion node to a voltage level having reduced temporal variation during pixel reset operations The active reset circuit may include an NMOS transistor (i.e., an n-channel load transistor) having a gate coupled to a reference voltage. The active reset circuit may further include a PMOS transistor (i.e., a p-channel gain transistor) having a gate coupled to the floating diffusion node, a first source-drain terminal coupled to the voltage supply, and a second source-drain terminal coupled to a ground through the NMOS transistor. The active reset circuit may further include a reset transistor coupled between the floating diffusion node and the second source-drain terminal of the PMOS transistor. A pre-charge or bias transistor may be coupled between the voltage supply and the first source-drain terminal of the PMOS transistor.

The sampling circuit may be interposed between the first source-drain terminal of the PMOS transistor and the column sensing line. The sampling circuit may include a sampling transistor, a sampling capacitor having a first terminal coupled to the first source-drain terminal of the PMOS transistor through the sampling transistor and having a second terminal coupled to ground, and an amplifier interposed between the first terminal of the sampling capacitor and the column sensing line. The sampling transistor may be a PMOS sampling transistor.

The amplifier may include a source follower transistor having a gate terminal coupled to the first terminal of the sampling capacitor, wherein the source follower transistor is interposed between the voltage supply and the column sensing line; and a row select transistor interposed between the source follower transistor and the column sensing line. The amplifier may further include an active sampling circuit. In some embodiments, the source follower transistor may be an NMOS source follower transistor. In some embodiments, the source follower transistor may be a PMOS source follower transistor.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor pixel comprising:
   a photosensitive element that generates charge in response to incident light;
   a floating diffusion node coupled to the photosensitive element;
   a first transistor having a gate coupled to a reference voltage;
   a second transistor having a gate coupled to the floating diffusion node, a source terminal coupled to a voltage supply, and a drain terminal coupled to a ground through the first transistor; and
   a third transistor coupled between the floating diffusion node and the drain terminal of the second transistor; and
   a sampling circuit coupled to the source terminal of the second transistor.

2. The image sensor pixel defined in claim 1, wherein the first transistor is an NMOS transistor.

3. The image sensor pixel defined in claim 1, wherein the second transistor is a PMOS transistor.

4. The image sensor pixel defined in claim 1, wherein the sampling circuit is interposed between the source terminal of the second transistor and a column sensing line.

5. The image sensor pixel defined in claim 4, wherein the sampling circuit comprises:
   a sampling transistor;
   a sampling capacitor having a first terminal coupled to the source terminal of the second transistor through the sampling transistor and having a second terminal coupled to ground; and
   an amplifier interposed between the first terminal of the sampling capacitor and the column sensing line.

6. The image sensor pixel defined in claim 5, wherein the sampling transistor is a PMOS sampling transistor.

7. The image sensor pixel defined in claim 5, wherein the amplifier comprises:
   a source follower transistor having a gate terminal coupled to the first terminal of the sampling capacitor, wherein the source follower transistor is interposed between the voltage supply and the column sensing line; and
   a row select transistor interposed between the source follower transistor and the column sensing line.

8. The image sensor pixel defined in claim 7, wherein the source follower transistor is a PMOS source follower transistor.

9. The image sensor pixel defined in claim 7, wherein the source follower transistor is an NMOS source follower transistor.

10. The image sensor pixel defined in claim 1, wherein the sampling circuit is a PMOS sampling transistor coupled to the source terminal of the second transistor.

11. The image sensor pixel defined in claim 1, further comprising:
    a pre-charge transistor, wherein the source terminal of the second transistor is coupled to the voltage supply through the pre-charge transistor.

12. The image sensor pixel defined in claim 1, wherein the first transistor, the second transistor, and the third transistor form an active reset circuit that sets the floating diffusion node to a voltage level during pixel reset operations.

13. An image sensor pixel comprising:
    a photosensitive element that generates charge in response to incident light;
    a floating diffusion node coupled to the photosensitive element;
    a first transistor having a gate coupled to a reference voltage;
    a second transistor having a gate coupled to the floating diffusion node, a source terminal coupled to a voltage supply, and a drain terminal coupled to a ground through the first transistor;
    a third transistor coupled between the floating diffusion node and the drain terminal of the second transistor; and
    a pre-charge transistor, wherein the source terminal of the second transistor is coupled to the voltage supply through the pre-charge transistor.

14. The image sensor pixel defined in claim 13, wherein the first transistor is a load transistor.

15. The image sensor pixel defined in claim 14, wherein the second transistor is a source follower transistor.

16. The image sensor pixel defined in claim 15, wherein the third transistor is a reset transistor.

17. An imaging system comprising:
    an array of imaging pixels arranged in rows and columns, wherein each imaging pixel in the array of imaging pixels comprises:
      a photodiode that accumulates charge in response to incident light;
      a transfer transistor coupled to the photodiode;
      a floating diffusion region coupled to the photodiode through the transfer transistor;
      a column sensing line;
      a p-channel transistor having a gate coupled to the floating diffusion region, wherein the p-channel transistor has a source terminal coupled to the column sensing line;
      an n-channel transistor interposed between a drain terminal of the p-channel transistor and ground, wherein the n-channel transistor has a gate terminal that receives a reference voltage; and
      a transistor coupled between the floating diffusion region and the p-channel transistor.

18. The imaging system defined in claim 17, each imaging pixel in the array of imaging pixels comprising:
    an anti-blooming transistor interposed between the photodiode and a voltage supply.

19. The imaging system defined in claim 17, wherein the transfer transistor is interposed between the photodiode and the floating diffusion region.

20. The imaging system defined in claim 17, each imaging pixel in the array of imaging pixels further comprising:

a pre-charge transistor, wherein the source terminal of the p-channel transistor is coupled to a voltage supply through the pre-charge transistor.

* * * * *